(12) United States Patent
Murakami et al.

(10) Patent No.: US 12,481,922 B2
(45) Date of Patent: Nov. 25, 2025

(54) NON-TRANSITORY COMPUTER-READABLE STORAGE MEDIUM FOR STORING MACHINE LEARNING PROGRAM, MACHINE LEARNING METHOD, AND MACHINE LEARNING APPARATUS OF IMPROVING PREDICTION ACCURACY IN KNOWLEDGE GRAPH EMBEDDING

(71) Applicant: FUJITSU LIMITED, Kawasaki (JP)

(72) Inventors: Katsuhiko Murakami, Yokohama (JP); Yutaka Mitsuishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 743 days.

(21) Appl. No.: 17/866,684

(22) Filed: Jul. 18, 2022

(65) Prior Publication Data
US 2023/0135468 A1    May 4, 2023

(30) Foreign Application Priority Data

Nov. 4, 2021    (JP) .................. 2021-180266

(51) Int. Cl.
*G06N 20/00* (2019.01)
*G06F 18/21* (2023.01)

(52) U.S. Cl.
CPC ........... *G06N 20/00* (2019.01); *G06F 18/217* (2023.01)

(58) Field of Classification Search
CPC ...... G06N 20/00; G06N 3/042; G06N 3/0985; G06N 5/022; G06F 18/217; G06F 17/16
See application file for complete search history.

(56) References Cited

U.S. PATENT DOCUMENTS

| | | |
|---|---|---|
| 2019/0205964 A1 | 7/2019 | Onoro Rubio et al. |
| 2020/0160215 A1 | 5/2020 | Kotnis et al. |
| 2020/0293905 A1 | 9/2020 | Huang et al. |

FOREIGN PATENT DOCUMENTS

| | | |
|---|---|---|
| CN | 113421614 A | 9/2021 |
| JP | 2019-125364 A | 7/2019 |
| JP | 2020-149663 A | 9/2020 |

OTHER PUBLICATIONS

Kolda, Tamara G., and Brett W. Bader. "Tensor decompositions and applications." SIAM review 51.3 (2009): 455-500.*
Extended European Search Report dated Dec. 16, 2022 for corresponding European Patent Application No. 22184674.4, 7 pages.

(Continued)

*Primary Examiner* — Asher D Kells
(74) *Attorney, Agent, or Firm* — Fujitsu Intellectual Property Center

(57) ABSTRACT

A non-transitory computer-readable recording medium storing a machine learning program for causing a computer to executes processing, the processing including: generating a tensor representing a plurality of pieces of triple data; and executing tensor decomposition, when performing the tensor decomposition of the tensor into a core tensor and factor matrices, under a condition that a value of a first element of the factor matrix corresponding to first triple data among the plurality of pieces of triple data and a value of an element of the core tensor are fixed.

8 Claims, 6 Drawing Sheets

(56) References Cited

OTHER PUBLICATIONS

European Patent Office Action—Summons to attend oral proceedings of European Patent Application No. 22184674.4 dated Nov. 23, 2023 [7 pages]. Reference CN 113421614 cited in the Office Action was previously submitted in the IDS filed on Mar. 10, 2023.
Ivana Balazevic et al., "TuckER: Tensor Factorization for Knowledge Graph Completion", Proceedings of the 2019 Conference on Empirical Methods in Natural Language Processing and the 9th International Joint Conference on Natural Language Processing, 2019 Association for Computational Linguistics, pp. 5185-5194, Nov. 3-7, 2019 (Total 10 pages).

* cited by examiner

NON-TRANSITORY COMPUTER-READABLE STORAGE MEDIUM FOR STORING MACHINE LEARNING PROGRAM, MACHINE LEARNING METHOD, AND MACHINE LEARNING APPARATUS OF IMPROVING PREDICTION ACCURACY IN KNOWLEDGE GRAPH EMBEDDING

CROSS-REFERENCE TO RELATED APPLICATION

This application is based upon and claims the benefit of priority of the prior Japanese Patent Application No. 2021-180266, filed on Nov. 4, 2021, the entire contents of which are incorporated herein by reference.

FIELD

The embodiment discussed herein is related to a machine learning technique.

BACKGROUND

Statistical machine learning is a technique for automatically extracting effective knowledge from data based on a statistical method. The statistical machine learning may perform learning with high accuracy in a case where many cases apply. By contrast, statistical learning of domain knowledge and exceptional data is difficult, and thus is unsuitable for the statistical machine learning. By using the statistical machine learning, for example, prediction (inference) of relationships between substances from various pieces of biodata and discovery of relationships latent in data are expected.

Generally, in machine learning, there is a possibility that an error occurs in a prediction result even when learned data is input to a machine learning model. For example, in a case where prediction is incorrect for a famous case or a characteristic case, there is a high risk that a user will lose trust in the accuracy of the machine learning.

Embedding of a knowledge graph (KG) is used in the statistical machine learning in some cases. The knowledge graph is a framework that systematically expresses knowledge in a specialized field or the like. Various models have been studied in a technique for embedding the knowledge graph.

In the knowledge graph, knowledge is expressed in a form called a triple such as "a value (object) of r (predicate) is o for s (subject)". The subject (s) and the object (o) are referred to as entities, and the predicate (r) is referred to as a relation. The triple is symbolically expressed as [s, r, o], and three elements of the triple are expressed by three vectors in an embedding space, respectively. By assuming that the knowledge is triple data and expressing each of the entity and the relation as a vector is equivalent to embedding, this embedding makes it possible to predict an unknown triple. For example, in a case where biodata is used, various types of proteins serve as the entities, and a reaction result, a generation state, and the like serve as the relations. The entities range from 100 to several hundred thousand types, and the relations are about 10 to 100 types.

By performing the statistical machine learning by using the knowledge graph, it is desirable to specify an event of interest, grasp another event related to a designated event, and interpret a relationship between pieces of data. An event related to a specific event is an event in which an entity or a relation of the specific event is linked and simultaneously established. The event related to the specific event is, for example, an event that "a gene #A has a mutation #X, a gene #B has a mutation #Y, and a drug #Z affects a pathway #P, which are related to each other".

There are various models for embedding the knowledge model. For example, as the embedding of the knowledge model, there are RESCAL, DistMult, HolE, ComplEx, Analogy, SimplE, BlockHolE, and the like. Learning and prediction are performed such that these are true when a scoring function represented by $\varphi(s, r, o)$ is close to 1. Besides, as the embedding of the knowledge model, there are TransE, TransH, TransR, STransR, and the like. Learning and prediction are performed such that these are true when a scoring function ($\varphi$) is close to 0. As a cost function at the time of learning of knowledge graph embedding, a sum of these scoring functions in all triples is used.

A case where (s, r, o) which is triple data expressing knowledge, is positive example data will be considered. A score of the triple data is represented by $\varphi(s, r, o)$. By rewriting the positive example data, a set of negative example data may be generated.

A cost function is represented by the following equation:

$$L=\Sigma_{(s,r,o)\in g,(s',r,o')\in g'}[\gamma-\varphi(s,r,o)+\varphi(s',r,o')]_+, [x]_+=\max(0,x)$$

where $\gamma$ is a margin hyper parameter, and $\gamma>0$. When a value in parentheses of a cost function is negative, for example, when a difference $\varphi(s, r, o)-\varphi(s', r, o')$ between a positive example score and a negative example score is equal to or greater than $\gamma$, learning is not performed.

There is a method called TuckER that uses Tucker decomposition for embedding a knowledge graph. The Tucker decomposition is a decomposition in which a tensor is divided into a set of a core tensor that is a small tensor and matrices corresponding to each mode. The mode is each axis of the tensor before decomposition. According to the TuckER, a score function is represented by a set of a core tensor and matrices corresponding to each mode.

Generally, only correct cases are collected in a normal knowledge graph. For example, positive example data is collected as training data. When learning is performed by limiting the training data to be used for machine learning to the positive example data, there may be a case where it is difficult to separate vectors indicating entities from each other. Accordingly, generation of a negative example is desired. For example, a technique has been proposed in which learning is performed by assuming that all non-positive examples are negative examples. According to this technique, learning is performed by using a part of possible negative examples. In the prediction after the learning is completed, it is predicted to be true when a score of an input triple is larger than a threshold. According to this technique, when a dimension is sufficient, it is possible to give a vector value that completely expresses a true or false value according to the training data. This technique generalizes other models in the related art such as DistMult, ComplEx, and SimplE. As prediction accuracy of this technique, the accuracy that may be compared with SOTA such as ComplEx may be obtained.

By the way, in a case where machine learning is generally performed, all pieces of training data are equally learned. Although it is possible to predict the true or false of an unknown triple by such learning, it is not easy to interpret a reason or basis leading to such prediction.

There is a technique in which a data set including attributes of entities indicating a plurality of commodities is collected to generate a knowledge graph, learning is performed with the generated knowledge graph, and a commodity recommended to a user is determined. There is a technique for converting a training sample in which a relationship between two corresponding actual objects is determined in advance into a product of relationship matrices, and generating a neural network by using the product of the converted relationship matrices. There is a technique in which embedding of a knowledge graph is learned by jointly minimizing a loss in prediction of the knowledge graph and a numerical attribute, and a numerical attribute propagation algorithm is used to predict a node having a missing numerical attribute by using numerical values of nodes labeled as an adjacency matrix of the knowledge graph.

Japanese Laid-open Patent Publication Nos. 2019-125364 and 2020-149663, and a specification of U.S. Patent Application Publication No. 2020/0160215 are disclosed as related art.

SUMMARY

According to an aspect of the embodiments, there is provided a non-transitory computer-readable recording medium storing a machine learning program for causing a computer to executes processing, the processing including: generating a tensor representing a plurality of pieces of triple data; and executing tensor decomposition, when performing the tensor decomposition of the tensor into a core tensor and factor matrices, under a condition that a value of a first element of the factor matrix corresponding to first triple data among the plurality of pieces of triple data and a value of an element of the core tensor are fixed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, in a case where the statistical machine learning of the related art is performed, there remains a possibility of an incorrect prediction determination after learning even with learned data. For this reason, even with the technique using TuckER with limited number of dimensions of core tensor, there is no guarantee that all pieces of training data are true. Accordingly, there is a risk that the prediction is incorrect for a famous case or a characteristic case, and there is a risk that reliability with respect to the accuracy of machine learning is lowered.

The disclosed technique is developed in consideration of the above-described situation, and an object thereof is to provide a machine learning program that suppresses a decrease in reliability of machine learning with respect to the accuracy, a machine learning method, and a machine learning apparatus.

Hereinafter, an embodiment of a machine learning program, a machine learning method, and a machine learning apparatus disclosed in this disclosure will be described in detail with reference to the drawings. The following embodiment is not intended to limit the machine learning program, the machine learning method, and the machine learning apparatus disclosed in this disclosure.

EMBODIMENT

Figure 1:
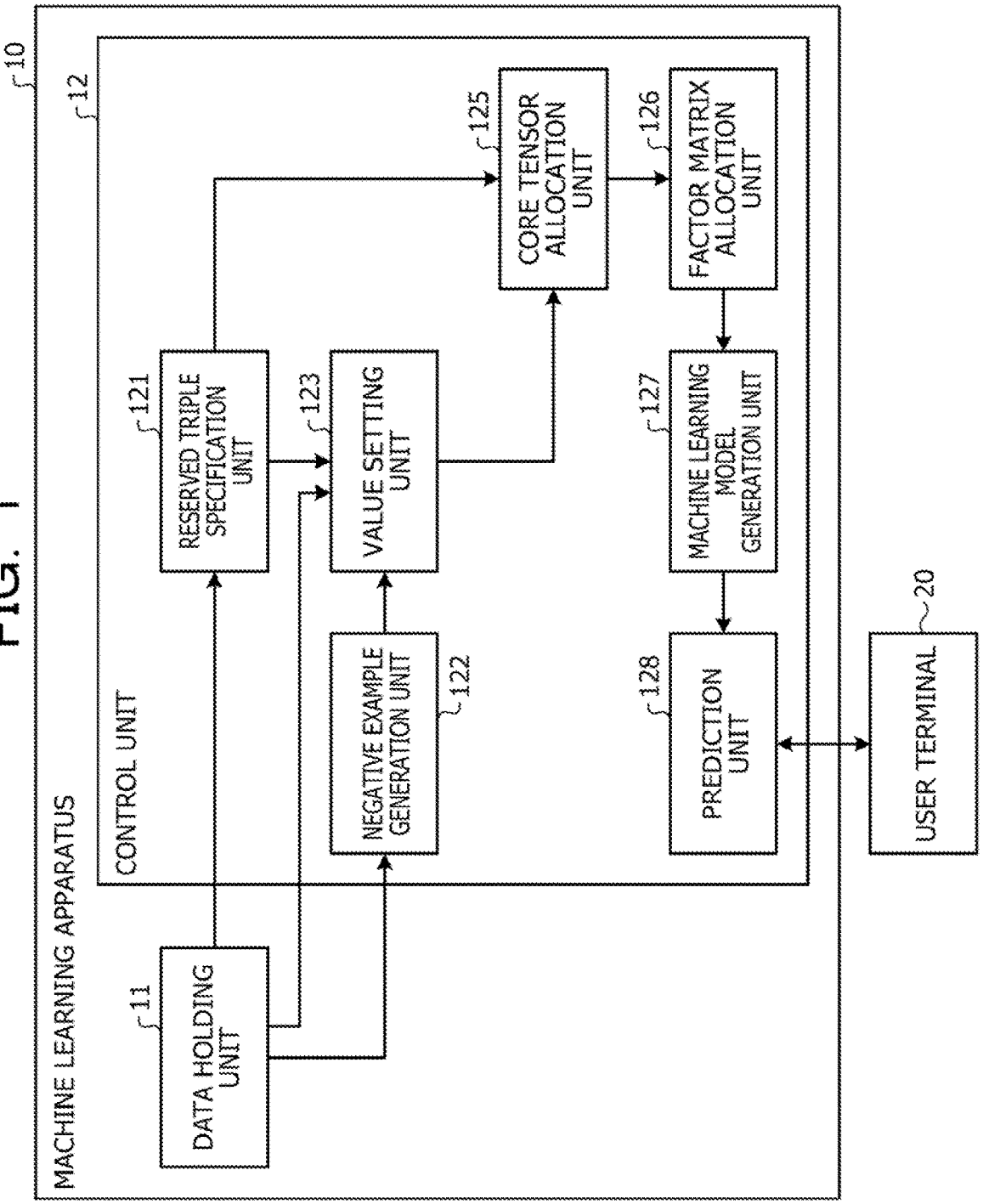
FIG. 1 is a block diagram of a machine learning apparatus according to an embodiment.

FIG. 1 is a block diagram of a machine learning apparatus according to the embodiment. As illustrated in FIG. 1, a machine learning apparatus 10 includes a data holding unit 11 and a control unit 12.

The data holding unit 11 holds triple data of which description is true in advance as training data. For example, when an entity ($e_1$) that serves as a subject is "Japan", an entity ($e_2$) that serves as an object is "Tokyo", and a relation ($r_1$) that serves as a predicate is "capital", this triple data is represented by ($e_1$, $r_1$, $e_2$).

All the pieces of triple data held by the data holding unit 11 are collectively represented as a third order tensor. For example, when the number of entities is ne and the number of relations is nr, a tensor representing all the pieces of triple data is a third order tensor of ne×nr×ne.

Figure 2:
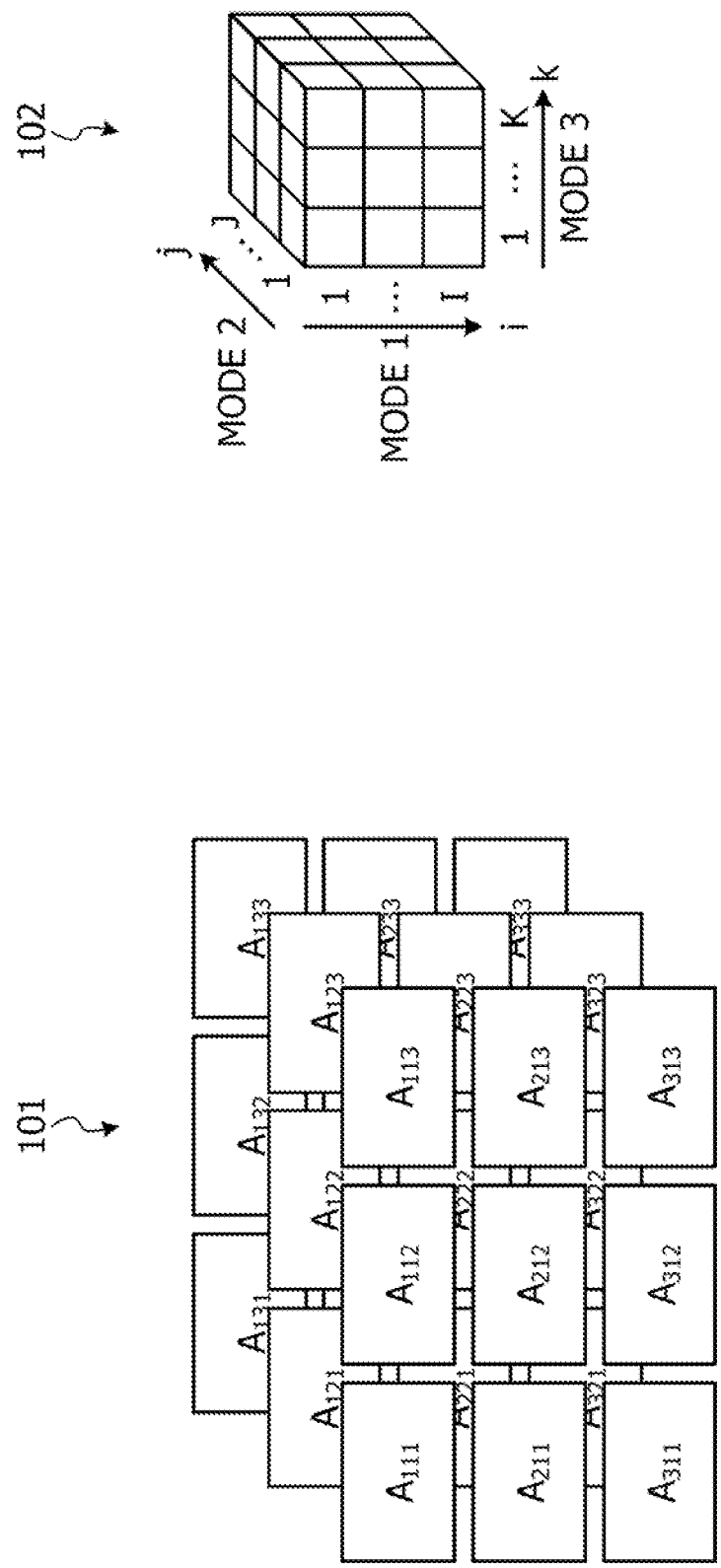
FIG. 2 is a diagram for explaining a third order tensor.

FIG. 2 is a diagram for explaining the third order tensor. The third order tensor is a three dimensional array. The number of order corresponds to the number of dimensions of an array that represents a tensor. For example, a first order tensor is a vector, and a second order tensor is a matrix. A position of each element in the tensor is represented by a subscript. For example, each element of a third order tensor 101 in FIG. 2 is represented by $A_{111}$ to $A_{333}$. An index expression of the third order tensor 101 is represented by $A_{ijk}$. A symbolic expression of the third order tensor 101 is represented by A.

In a case where the number of the third order tensor in each dimension direction is n and the number of order is m, the number of components that is the total number of elements of the third order tensor is nm. For example, since n=3 and m=3 in the third order tensor 101 in FIG. 2, the number of components is $3^3$=27.

An axis indicating an array direction corresponding to each dimension in the array of the third order tensor is referred to as a mode. For example, as indicated in a third order tensor 102 in FIG. 2, each axis representing three dimensions corresponds to modes 1 to 3. For example, the number of modes corresponds to the number of order. The number of elements in a direction of the mode 1 of the third order tensor 102 is I, the number of elements in a direction of the mode 2 is J, and the number of elements in a direction of the mode 3 is K. A subscript representing a position in the direction of the mode 1 is denoted by i, a subscript representing a position in the direction of the mode 2 is denoted by j, and a subscript representing a position in the direction of the mode 3 is denoted by k. In this case, the position of the element may be represented by using three subscripts (i, j, k) as an index. Assuming that the third order tensor 102 is A, and the element at the position (i, j, k) is $a_{ijk}$, it may be represented as A=($a_{ijk}$) (i=1, 2, . . . , I; j=1, 2, . . . , J; k=1, 2, . . . , K). The number of components that is the total number of elements of the third order tensor 102 is I×J×K. The $a_{ijk}$ representing each element of the third order tensor 102 is also written as $a_{i1,i2,i3}$ with (i, j, k) as $(i_1, i_2, i_3)$.

The control unit 12 performs tensor decomposition by representing learning triple data by a tensor, and performs prediction by a machine learning model generated by using a result of the tensor decomposition. Hereinafter, details of the control unit 12 will be described. The control unit 12 includes a reserved triple specification unit 121, a negative example generation unit 122, a value setting unit 123, a core tensor allocation unit 125, a factor matrix allocation unit 126, a machine learning model generation unit 127, and a prediction unit 128.

For example, the reserved triple specification unit 121 receives information input of triple data for which it is desired to guarantee that a correct answer is predicted in prediction after learning designated by a user from an external device (not illustrated). For example, the triple data for which the correct answer is to be guaranteed in the prediction after the learning is triple data for which determination is to be guaranteed as indicated by a correct answer label of specific triple data in a case where the specific triple data is used for the learning and the true or false of the specific triple data is predicted by using the machine learning model created by the learning. In the embodiment, prediction of true or false by a trained machine learning model as indicated by the correct answer label of teacher data is expressed as "to be correct" or "predict correct answer". Whether the trained machine learning model is correct is an event that occurs for each piece of triple data. Such triple data is considered to be a triple of interest to the user. From among the pieces of triple data held by the data holding unit 11, the reserved triple specification unit 121 extracts a piece of triple data for which correct answer is to be guaranteed in the prediction after the learning in accordance with the designation. A set of pieces of triple data that are extracted by the reserved triple specification unit 121 and are to be guaranteed to be correct in the prediction after learning is a "reserved triple". After that, the reserved triple specification unit 121 outputs information on the reserved triple to the value setting unit 123.

The negative example generation unit 122 executes generation of new negative example data based on positive example data included in the triple data held by the data holding unit 11. For example, a description will be given of a case where triple data represented by (s, r, o) is positive example data, where s is a subject, o is an object, and r is a predicate representing a relationship between s and o. A score of a triple is defined as φ(s, r, o). In a case where a set of entities is denoted by E, and a set of positive example data is denoted by g, the negative example generation unit 122 generates negative example data of the triple by the following Expression (1) or (2).

$$\mathcal{G}'_{(s,r,o)} = \{(s',r,o) | s' \in \mathcal{G}', (s',r,o) \notin \mathcal{G}'\} \cup \{(s,r,o') | o' \in \mathcal{G}', (s,r,o') \cup \mathcal{G}'\} \quad (1)$$

$$\mathcal{G}'_{(s,r,o)} = \{(s',r,o') | s' \in \mathcal{G}', o' \in \mathcal{G}', (s',r,o') \cup \mathcal{G}'\} \quad (2)$$

After that, the negative example generation unit 122 outputs information on the generated triple data of the negative example to the value setting unit 123. Hereinafter, the triple data of the negative example is simply referred to as negative example data. When the negative example exists in the teacher data, a correct answer label of "false" corresponds to the triple, and it is "correct answer" that is predicted to be false by the machine learning model. When a prediction label of "true" is attached to the negative example, the prediction result is "incorrect answer". An ideal machine learning model outputs a low score for a negative example and outputs a high score for a positive example. According to the present embodiment, it is possible to perform machine learning that satisfies a constraint that "it is guaranteed that the trained machine learning model predicts a correct answer for a reserved triple".

The value setting unit 123 acquires all pieces of triple data held by the data holding unit 11. The value setting unit 123 receives input of information on the reserved triple from the reserved triple specification unit 121. The value setting unit 123 receives input of information on the negative example data generated by the negative example generation unit 122 from the negative example generation unit 122.

The value setting unit 123 generates a third order tensor representing all the pieces of acquired triple data. Hereinafter, the third order tensor generated by the value setting unit 123 is described as a third order tensor X or simply X. Each element of the third order tensor X is represented by $x_{ijk}$.

The value setting unit 123 represents each entity and each relation by a vector so that different entities are different vectors and different relations are different vectors. By using each vector, the value setting unit 123 specifies a position of each piece of triple data in the generated third order tensor X.

For example, a case where the number of entities is four and the number of relations is four will be described. The value setting unit 123 represents different entities e1 to e4 as e1=(1, 0, 0, 0), e2=(0, 1, 0, 0), e3=(0, 0, 1, 0), and e4=(0, 0, 0, 1), respectively. The value setting unit 123 represents different relations r1 to r4 as r1=(1, 0, 0, 0), r2=(0, 1, 0, 0), r3=(0, 0, 1, 0), and r4=(0, 0, 0, 1), respectively. In this case, since a subject of the triple data of (e1, r1, e2) is a first entity, a predicate is a first relation, and an object is a second entity, the value setting unit 123 specifies the triple data as the element at the position (1, 1, 2) in the third order tensor X.

The value setting unit 123 specifies a reserved triple among elements of the third order tensor X. The value setting unit 123 specifies the positions of all the pieces of triple data held by the data holding unit 11 that is the positive example data among the elements of the third order tensor X. The value setting unit 123 sets 1 as a value of the positive example data. For example, when the positive example data is $x_{lmn}$, the value setting unit 123 sets $x_{lmn}=1$.

The value setting unit 123 specifies a position of the negative example data generated by the negative example generation unit 122 among the elements of the third order tensor X. The value setting unit 123 sets 0 as a value of the negative example data. For example, when the negative example data is $x_{opq}$, the value setting unit 123 sets $x_{opq}=0$.

The value setting unit 123 sets m for undetermined data that is triple data that is neither the positive example data nor the negative example data. For example, when the undetermined data is set as $x_{rst}$, the value setting unit 123 sets $x_{rst}=m$. m is a value between 0 which is a value of the negative example data, and 1 which is a value of the positive example data. For example, the value setting unit 123 may set m=0.5.

Figure 3:
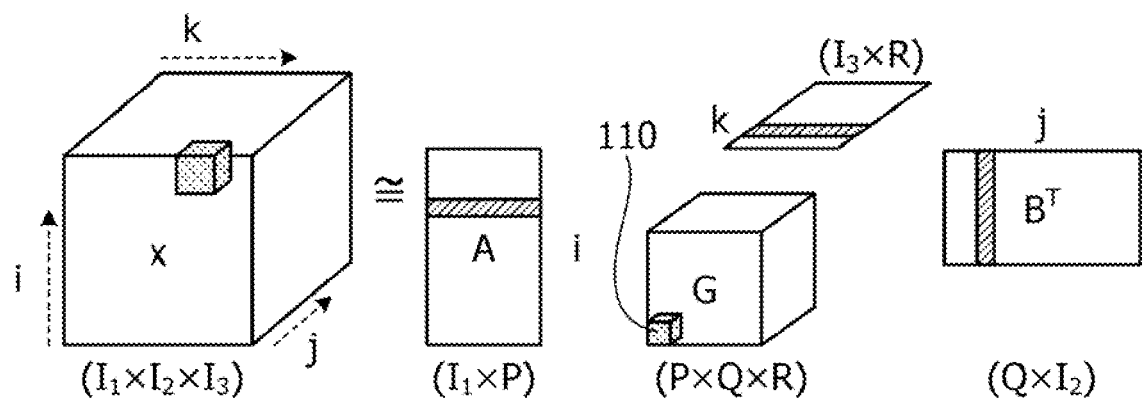
FIG. 3 is a diagram for explaining tensor decomposition.

A basic method for tensor decomposition of the third order tensor X will be described. The tensor decomposition corresponds to learning of teacher data. This method is described in the present embodiment for reference. This method is changed and used in processing of the core tensor allocation unit 125, the factor matrix allocation unit 126, and the machine learning model generation unit 127, which will be described later. Tucker decomposition is performed on the third order tensor X to obtain G that is a core tensor and factor matrices A to C as illustrated in FIG. 3. For example, a tensor decomposition unit 124 approximately represents X by the following Expressions (3) and (4) using a product of G which is a core tensor and factor matrices A to C. FIG. 3 is a diagram for explaining the tensor decomposition.

$$x_{ijk} \cong \phi_{ijk} = \sum_{p=1}^{P}\sum_{q=1}^{Q}\sum_{r=1}^{R} g_{pqr} a_{ip} b_{jq} c_{kr} \quad (3)$$

$$x \cong \psi = G \times_1 A \times_2 B \times_3 C \quad (4)$$

A subscript before A, B, and C representing the factor matrix in Expression (4) represents a mode to which each matrix corresponds. In this case, it may be expected that three vectors having each of $g_{pqr}$ and corresponding ($a_{ip}$, $b_{jq}$, $c_{kr}$) as elements capture a feature of change in each axial direction of the third order tensor X, for example, a direction of each mode. $g_{pqr}$ may be regarded as a latent variable that holds a correlation, and absolute values of $g_{pqr}$ represent magnitudes of interaction levels between different axes of the third order tensor X. A magnitude (P, Q, R) of G that is a core tensor is preferably set to be smaller than that of the third order tensor X. For example, P<I, Q<3, and R<K. This is because X is interpreted by a combination of a small number of patterns represented by (G, A, B, C).

By the tensor decomposition of the third order tensor X, a core tensor G and factor matrices A to C are determined. In a basic tensor decomposition process, first, initial values of the core tensor G and the factor matrices A to C are appropriately determined by random values, parameters are repeatedly updated little by little so as to reduce a loss function determined by Expression (7) or (8) described later, and when a stop condition of the repetition is satisfied, values of the core tensor G and the factor matrices A to C at that time point are set as a solution of the tensor decomposition.

According to the TuckER method used in the present embodiment, the following modified TuckER decomposition (learning) is performed by transforming the above. $x_{ijk}$ is teacher data, and takes a value of 1 when the triple (s, r, o) is true, and takes a value of 0 when the triple (s, r, o) is false. $x_{ijk}$ is represented by Expression (5). $p_{ijk}$ is a calculation result by a machine learning model that approximates this $x_{ijk}$, and the machine learning model is trained by TuckER decomposition that is formulated by Expression (5) and Expression (6). σ is a sigmoid function. ($\varphi_{ijk}$)=σ([G×$_1$A×$_2$B×$_3$C](i,j,k)). Since the mode 1 and the mode 3 are assumed to be the same entity and C=A, $\varphi_{ijk}$ is represented by Expression (6). After a certain number of sequential updates are completed, the G, A, and B at that time are a tensor-decomposed solution, which may be used for prediction.

$$p_{ijk} = \sigma(\phi_{ijk}) \quad (5)$$

$$\phi_{ijk} = [G \times_1 A \times_2 B \times_3 A]_{(i,j,k)}$$

The core tensor allocation unit 125 acquires information on a reserved triple from the reserved triple specification unit 121. The core tensor allocation unit 125 receives information on the third order tensor X from the value setting unit 123.

Next, the core tensor allocation unit 125 allocates and reflects the information on the reserved triple in an initial core tensor G in which a random value is set for each element. First, the core tensor allocation unit 125 divides the reserved triple into the number of groups t. When grouping is unnecessary, the group may be set to 1 (t=1). The grouping is intended to improve the interpretability, and is not necessarily desired processing. The core tensor allocation unit 125 allocates t elements of the number of groups among the elements included in the initial core tensor to each group of the reserved triples. For example, when the number of groups of a feature pattern of the reserved triple is t, the core tensor allocation unit 125 appropriately selects t elements from among the elements included in the initial core tensor. The core tensor allocation unit 125 allocates each of the selected t elements to each group of the feature pattern of the reserved triple. For example, the core tensor allocation unit 125 allocates one element designated by a subscript 110 among the elements of the core tensor G in FIG. 3 to one group of the feature pattern of the reserved triple. When there are a plurality of groups, the core tensor allocation unit 125 allocates one element of the core tensor G to one group of the reserved triple by the number of groups. The core tensor allocation unit 125 notifies the factor matrix allocation unit 126 of the information on the elements allocated to each group of the feature pattern of the reserved triple in the core tensor G. Hereinafter, a group of reserved triples is simply referred to as a "group".

As described above, the reserved triples are divided into a plurality of groups in the core tensor allocation unit 125. However, it is preferable that the core tensor allocation unit 125 performs grouping on the assumption that the pieces of triple data in the group are related to each other. The phrase that "pieces of triple data are related to each other" refers to, for example, a relationship between the pieces of triple data that is appropriate to be predicted to be true or false in association with each other via $g_{ijk}$ that is an element of the allocated core tensor G. When it is expected that a plurality of pieces of triple data are not related to each other, it is preferable that the core tensor allocation unit 125 allocates the pieces of triple data as different groups to different elements of the core tensor G. Accordingly, an element having a relatively large absolute value of the core tensor G is allocated to each of the unrelated pieces of triple data. As a result, it is guaranteed that each of the pieces of triple data divided into the group is predicted to be correct even after the training. When it is considered that grouping of the reserved triples is not desired, there may be one group (t=1).

By contrast, when the unrelated pieces of triple data are allocated to $g_{ijk}$, which is one element of the core tensor G, as the same group, the value of $g_{ijk}$ may approach zero as a result of sequential learning in an inconsistent random direction, and in this case, it is not guaranteed that the triple data of the group is predicted as in the teacher data. Accordingly, as described above, it is preferable that the core tensor allocation unit 125 performs grouping on the assumption that the pieces of triple data in a group are related to each other.

The core tensor allocation unit 125 sets a value of an element allocated to a group of reserved triples in an initial core tensor G to q (q>>1). For example, q may be set to 10. A value of an element set by the factor matrix allocation unit 126 is fixed and not updated at the time of learning. For example, in a case where $g_{127}$ is allocated to one of the groups of reserved triples, the core tensor allocation unit 125 sets $g_{127}$=q. As expressed easily by Expression, an element of the allocated core tensor G is referred to as a "fixed core element ($g_{ijk}$)", and a set of "fixed core elements" is defined as Q={(p, q, r)|$g_{pqr}$=q}.

Next, the factor matrix allocation unit 126 fixes the value to 1 or −1 for a part of the elements of the factor matrices A to C for which the product with elements in the positions in the core tensor G to which the group of the reserved triples is allocated is executed. It may be assumed that the mode 1 and the mode 3 indicate the same entity set. In this case, the factor matrix C=A holds. As described above, in a case where $g_{127}$ is allocated to one of the groups of the reserved triples, when the calculation of Expression (6) is performed, the elements of the factor matrices A and B for which the product with the element $g_{127}$ located at the position of (1, 2, 7) in the core tensor G is executed are $a_{i1}$, $b_{j2}$, and $a_{k7}$.

Among the elements represented by $a_{i1}$, $b_{j2}$, and $a_{k7}$, the factor matrix allocation unit 126 fixes the value of the element that affects the reserved triple to 1 or −1. For example, in a case where there are two reserved triples of the positive example (3, 1, 4) and the negative example (3, 1, 5) in the third order tensor X, the factor matrix allocation unit 126 sets $a_{31}=1$, $b_{12}=1$, $a_{47}=1$, and $a_{31}=1$, $b_{12}=-1$, $a_{57}=1$. In the reserved triple of the positive example, bjq=1. Even after learning, the tensor product of the reserved triple (3, 1, 4) of the positive example is greatly affected by the product of these, for example, the value of $(g_{127} \times a_{31} \times b_{12} \times a_{47} = q)$, and thus has a positive value. By contrast, in the reserved triple of the negative example, bjq=−1. As a result, even after learning, the tensor product of the reserved triple (3, 1, 5) of the negative example is greatly affected by the product of these, for example, the value of $(g_{127} \times a_{31} \times b_{12} \times a_{57} = -q)$, and thus has a negative value.

In this case, among the elements of the factor matrices A and B, the element of which the value is fixed by the factor matrix allocation unit 126 has a fixed value and is not updated at the time of learning. Conversely, an element of which the value is not fixed by the factor matrix allocation unit 126 is updated at the time of learning. For example, in a case where the factor matrix allocation unit 126 sets $a_m=1$, $b_{12}=1$, $a_{47}=1$, and $a_{31}=1$, $b_{12}=-1$, $a_{57}=1$, $a_{i'1}$, $b_{j'2}$, $a_{k'7}$ (i'≠i, j'≠j, k'≠k) among $a_{i1}$, $b_{j2}$, and $a_{k7}$ are not fixed and are updated at the time of learning. For the element that is not fixed, an appropriate value that matches the triple value other than the reserved triple is determined as a result of learning.

In a case where there are a plurality of groups of reserved triples, the factor matrix allocation unit 126 causes the triples treated as another group to correspond to another element of the core tensor G. For example, when there are a plurality of groups of reserved triples, the positions of the elements of the core tensors G to be allocated to the groups are determined such that the subscripts of the elements fixed by the factor matrix allocation unit 126 do not match between the groups.

After that, the factor matrix allocation unit 126 outputs the third order tensor X together with information on the elements having fixed values among the elements of the core tensor G and the factor matrices A to C and information on the fixed values to the machine learning model generation unit 127.

The machine learning model generation unit 127 receives input of information on the third order tensor X, the core tensor G, and the factor matrices A to C from the factor matrix allocation unit 126, together with the information on the elements having fixed values among the elements of the core tensor G and the factor matrices A to C and information on the fixed values. The machine learning model generation unit 127 constructs a model capable of predicting an unknown triple by learning data. First, the machine learning model generation unit 127 sets random initial values having sufficiently small absolute values for the elements of the core tensor G and the factor matrices A to C that are freely updated other than the fixed elements.

As a result of learning data in the machine learning model generation unit 127, a solution of tensor decomposition is obtained. Data learning and tensor decomposition are the same processing. After all the initial values are set by the value setting unit 123, the core tensor allocation unit 125, and the factor matrix allocation unit 126 above, the learning is executed by sequential update. A case where the number of entities is ne, the entities i and k are represented by i, k=1, ne, the number of relations is nr, and the relation r is r=1, nr will be described. In this case, the costs for all the entities and all the relations are represented by a loss function of the following Expression (7). However, Expression (7) is a total sum for all the positive example data and the negative example data except for the triple data having no correct answer label.

$$L_{def} = -\Sigma_{i,j,k}^{all\_triple}(x_{ijk}\log(p_{ijk})+(1-x_{ijk})\log(1-p_{ijk})) \qquad (7)$$

According to the present embodiment, a size of the core tensor G matches a dimension of the embedding vector. The size of the core tensor G is the number of elements arranged in each axial direction. For example, when the size of the core tensor G is too small, an error in the prediction processing after learning increases. Conversely, when the size of the core tensor G is too large, the related triples are allocated to elements of different core tensors G, and thus there is a risk that the relationship between the pieces of data becomes unclear. Accordingly, a generalized loss function for reducing this problem is considered. The tensor decomposition may be executed by using the loss function of Expression (7). The learning may be performed by setting the size of the core tensor G to be slightly large, and using the following Expression (8) in which regularization of a "$I_1$ norm (I-one norm)" constraint and a "$I_2$ norm (I-two norm)" constraint that reduce the number of elements that are not 0 in the core tensor G, for example, that cause sparsity is added to the loss function of Expression (7). ξ and τ are hyper parameters. A sum in Expression (8) is calculated for the core elements other than the set Ω of fixed core elements.

$$L_2 = L_{def} + \xi\Sigma_{(p,q,r)\cup\Omega}|g_{pqr}| - \tau\Sigma_{(p,q,r)\cup\Omega}|g_{pqr}|^2 \qquad (8)$$

The machine learning model generation unit 127 executes learning by using the triple data of the positive example data and the negative example data in Expression (7) to which temporary values of hyper parameters are given. At the time of learning with one set of fixed hyper parameters, each parameter is updated so as to minimize Expression (7). For example, the machine learning model generation unit 127 may use a gradient descent method or the like. At this time, the machine learning model generation unit 127 starts learning by setting sufficiently small random values as initial values for the elements of the factor matrices A to C that are freely updated. As the learning progresses, the absolute values of the elements of the factor matrices A to C that are freely updated increase, so that the approximation is improved and the cost decreases. As a result of repeating the sequential update, the machine learning model generation unit 127 stops learning when the cost improvement has stopped. Accordingly, the machine learning model generation unit 127 may obtain the core tensor G and the factor matrices A to C that approximate the third order tensor X representing the given triple data. Actually, C=A, but it is described as the factor matrices A to C.

The machine learning model generation unit 127 determines the hyper parameters in the loss function of Expression (8) to determine a best learning model. According to this method, the hyper parameters are determined by using cross-validation. For example, the tensor decomposition unit 124 performs decomposition in Expression (7) in which the operation of the loss function is regularized. The machine learning model generation unit 127 executes the tensor decomposition unit 124 for a set of various hyper parameters appropriately given in advance. The learning is executed for each pattern. The machine learning model generation unit 127 performs cross-validation by using each model obtained by learning, selects one model having a good (low) value of a loss function (Expression (8)) obtained for a result of the cross-validation, for example, a test set (data that is not used for learning among data for which a correct answer is known), and determines one optimum hyper parameter set among various hyper parameter sets. Expression (7) may be regarded as a case where and T are set to zero in Expression (8). In a case where loss functions of different patterns of a set of hyper parameters have the same error, the machine learning model generation unit 127 selects a smaller absolute value of $p_{ijk}$. As described above, by using the regularization of the "$l_1$ norm" constraint and the "$l_2$ norm" constraint as in Expression (7), the machine learning model generation unit 127 may also consider the magnitude of the absolute value as the cost. The size (p, q, r) of the core tensor G is also a hyper parameter, and is determined by verifying various values. As described above, the machine learning model generation unit 127 has an effect of eventually optimizing the size of the core tensor G.

After that, the machine learning model generation unit 127 outputs the obtained core tensor G and factor matrices A to C to the prediction unit 128.

The prediction unit 128 acquires information on the core tensor G and the factor matrices A to C that approximate the third order tensor X representing given triple data from the machine learning model generation unit 127. Next, by using the acquired core tensor G and factor matrices A to C, the prediction unit 128 predicts the true or false of an unknown triple of which true or false is unknown.

The dimensions of the mode 1 and the mode 3 indicating entities are the same as the number of entities. For example, I which is the number of rows of the factor matrix A, K which is the number of rows of the factor matrix C, and ne which is the number of entities are all equal to each other, and I=K=ne. The dimension of the mode 2 indicating a relation is the same as the number of relations. For example, J that is the number of rows of the factor matrix B and nr that is the number of relations are all equal to each other, and J=nr.

Focusing on i, an i-th row of the factor matrix A is set as an embedding vector of an entity ei. Focusing on k, a k-th row of the factor matrix A is set as an embedding vector of an entity ek. Focusing on j, a j-th row of the factor matrix B is set as an embedding vector of an entity rj. In this case, the prediction unit 128 calculates p=σ ($\varphi_{ijk}$) when predicting whether (ei, rj, ek) that is an unknown triple data is true or false. P=σ($\varphi_{ijk}$) may be regarded as a probability that (i, j, k) that is a triple data is true. For example, when p is equal to or greater than a predetermined prediction threshold, the prediction unit 128 predicts that (i, j, k) which is the triple data to be predicted, is true. For example, it is possible to set the prediction threshold to 0.5.

For example, the prediction unit 128 may identify a new triple related to the triple data set as the reserved triple at the time of learning, and may determine that the triple is true. The method of identifying the new triple related to the triple data set as the reserved triple will be described below. As a premise, the reserved triple is a known fact in which a user is highly interested.

At the time of learning, a large value q is set for the element of the core tensor G allocated to the group of reserved triples. For example, the large value q may be 10. For example, in a case where $g_{127}$ that is an element of the core tensor G is allocated to a group of reserved triples, a value of $g_{127}$ is fixed as q. In this case, the value is fixed for the element that is the reserved triple among $a_{i1}$, $b_{j2}$, and $a_{k7}$. $a_{i'1}$, $b_{j'2}$, and $a_{k'7}$ (i'≠i, j'≠j, k'≠k) other than the fixed elements are not fixed, and are updated at the time of learning with sufficiently small values as an initial values. In a case where related triple data exists, it may be expected that absolute values of $a_{i'1}$, $b_{j'2}$, and $a_{k'7}$ are increased in order to match with teacher data that affects the cost function.

Accordingly, the prediction unit 128 searches for an element having an absolute value equal to or greater than an identification threshold among elements of which values are not fixed at the time of learning among the elements of the factor matrices A and B corresponding to the elements of the core tensor G allocated to the group of the reserved triples. For example, 0.2 may be used as the identification threshold. For example, the prediction unit 128 searches for $a_{i'1}$, $b_{j'2}$, and $a_{k'7}$ of which absolute values are equal to or greater than the identification threshold. For example, when there are i', j', and k' that are triple data, the prediction unit 128 determines that $e_{i'}$, $e_{j'}$, and $e_{k'}$ are entities and relations related to $g_{127}$ and a reserved triple. There may be two or more of i', j', and k' respectively. Accordingly, the prediction unit 128 determines that the triple data of $x_{i'mn}$, $x_{lj'n}$, and $x_{lmk'}$ for the entity and the relation related to $g_{127}$ and the reserved triple are triple data related to $g_{127}$ and the reserved triple. Among the pieces of triple data related to these reserved triples, the prediction unit 128 specifies the true triple data or the triple data of which the predicted value is true as a highly interested study target.

According to the learning technique in the related art, there is a possibility that the predicted value after learning is false despite the fact that the data is the triple data of the positive example data. For this reason, in the model after learning in the case of using the learning technique in the related art, since the training data and the prediction result do not necessarily match, there is a risk that a case where similar analysis is inconsistent and contradictory may occur. For this reason, in a case where the learning technique in the related art is used, it is difficult to detect triple data related to predetermined triple data.

By contrast, in the case of the learning method according to the present embodiment, by not updating the parameters corresponding to the reserved triples, it is guaranteed that the absolute values of $\varphi_{ijk}$ are very large values when the triple data related to the reserved triples are targeted for prediction. For example, it is guaranteed that p=σ($\varphi_{ijk}$), which is a probability that the triple data to be predicted is true in the positive example, is close to 1, and p=σ($\varphi_{ijk}$) is close to 0 in the negative example. Even when core tensor elements with different subscripts are replaced with each other, a factor matrix in which elements corresponding thereto are replaced with each other is generated, and thus $\varphi_{ijk}$ is unchanged. For example, even when $g_{pq5}$ and $g_{pq6}$ are replaced with each other, since the factor matrix A in which $a_{k5}$ and $a_{k6}$ are replaced with each other is generated, $\varphi_{ijk}$ is unchanged. Accordingly, it may be said that the order of the positions of the elements of the core tensor G allocated to each of the groups of reserved triples is not important. Each dimension of the core tensor G is considered to be the number of orders of each mode of the third order tensor X to be approximated. Accordingly, it may be said that a larger size of the core tensor G is more appropriate for more complex data.

After that, the prediction unit 128 notifies the user of the prediction result by, for example, transmitting the prediction result to a user terminal 20. For example, the prediction unit 128 may specify triple data related to the reserved triple from among the triple data stored in the data holding unit 11, and may transmit the specified triple data to the user terminal 20. As the prediction result for the triple data input from the user terminal 20, the prediction unit 128 may transmit a result of true/false determination and whether the triple data is related to the reserved triple to the user terminal 20.

Figure 4:
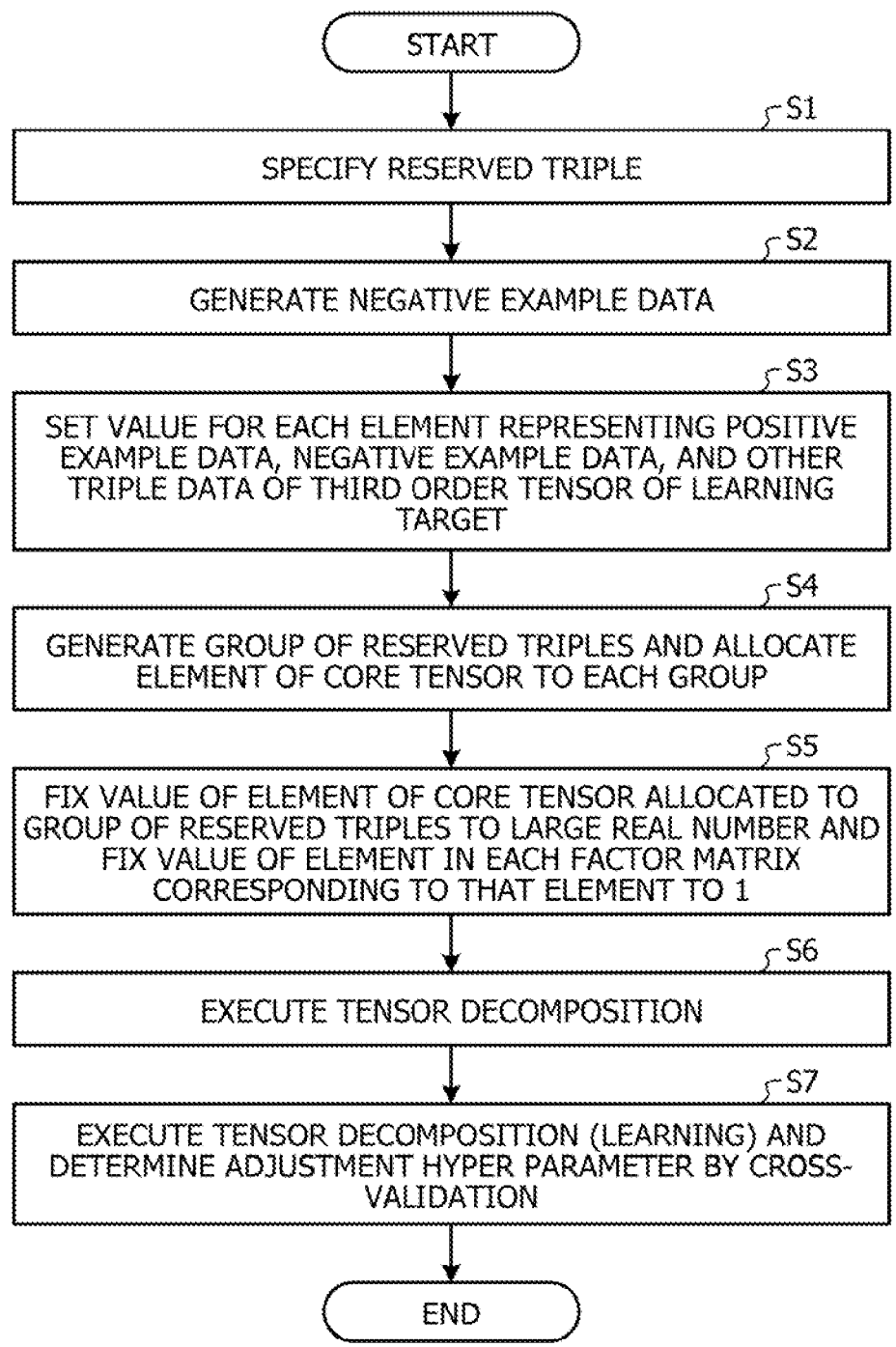
FIG. 4 is a flowchart of learning processing of triple data by a machine learning apparatus according to an embodiment.

FIG. 4 is a flowchart of triple data learning processing by the machine learning apparatus according to the embodiment. Next, referring to FIG. 4, the flow of the triple data learning processing by the machine learning apparatus 10 according to the embodiment will be described.

The reserved triple specification unit 121 specifies a reserved triple specified as triple data of interest to the user from among the triple data held by the data holding unit 11 (step S1). Both a positive example and a negative example may be included in the above-described reserved triple. After that, the reserved triple specification unit 121 outputs information on the specified reserved triple to the value setting unit 123 and the core tensor allocation unit 125.

The negative example generation unit 122 acquires the triple data that is the positive example data held by the data holding unit 11, and generates the negative example data by using Expression (1), (2), or the like (step S2). After that, the negative example generation unit 122 outputs the information on the negative example data to the value setting unit 123.

The value setting unit 123 acquires triple data that is training data from the data holding unit 11. The value setting unit 123 receives input of information on the reserved triple from the reserved triple specification unit 121. The value setting unit 123 receives input of information on the negative example data from the negative example generation unit 122. Next, the value setting unit 123 generates a third order tensor representing the true or false of the acquired triple data. The value setting unit 123 sets a value of an element corresponding to the positive example data to 1. The value setting unit 123 sets a value of an element corresponding to the negative example data to 0. The value setting unit 123 sets a value of an element corresponding to an unknown triple other than the positive example data and the negative example data to a value between 1 and 0 (step S3). After that, the value setting unit 123 outputs a third order tensor in which the values are set to the tensor decomposition unit 124.

After that, the value setting unit 123 outputs information on the third order tensor of the learning target, the core tensor, and the factor matrix to the core tensor allocation unit 125.

The core tensor allocation unit 125 receives input of information on the third order tensor of the learning target, and a core tensor and factor matrices after decomposition of the third order tensor from the tensor decomposition unit 124. The core tensor allocation unit 125 receives input of information on the reserved triple from the reserved triple specification unit 121. Next, the core tensor allocation unit 125 generates a group of feature patterns of the reserved triple. For each group of reserved triples, the core tensor allocation unit 125 allocates an element of the core tensor (step S4). After that, the core tensor allocation unit 125 outputs information on the core tensor, the factor matrix, and the third order tensor to which any element is allocated to each group of reserved triples to the factor matrix allocation unit 126.

The factor matrix allocation unit 126 receives input of information on the core tensor, the factor matrix, and the third order tensor to which any element is allocated to each group of reserved triples from the core tensor allocation unit 125. Next, the factor matrix allocation unit 126 sets and fixes the values of the elements of the core tensor to which each group of reserved triples is allocated to large real numbers. The factor matrix allocation unit 126 fixes the value of the element in each factor matrix corresponding to the element of the core tensor to which each group of the reserved triples is allocated to 1 (step S5). After that, the factor matrix allocation unit 126 outputs information on the core tensor in which the values of the elements to which each group of reserved triples is allocated are fixed, and the factor matrix and the third order tensor in which the values of the elements corresponding to the elements to which each group of reserved triples is allocated are fixed to the machine learning model generation unit 127.

The machine learning model generation unit 127 performs learning (tensor decomposition) by using a loss function including regularization of ($l_0$-norm) constraint represented by Expression (7) or Expression (8) for the acquired third order tensor (step S6). Accordingly, the machine learning model generation unit 127 obtains a coefficient so as to approximately represent X by $X_{ijk} \approx p_{ijk} = \sigma(\varphi_{ijk})$, and obtains a core tensor and factor matrces after learning. This corresponds to learning for a certain set of hyper parameters.

The machine learning model generation unit 127 separately performs the above-described learning for each given hyper parameter. By performing learning on one set of hyper parameters, one learning model is generated. The machine learning model generation unit 127 performs cross-validation on each model and outputs a correct answer rate. The machine learning model generation unit 127 selects a model having a high correct answer rate as an optimum model and determines hyper parameters. After that, the machine learning model generation unit 127 outputs the obtained optimum model to the prediction unit 128 (step S7).

Figure 5:
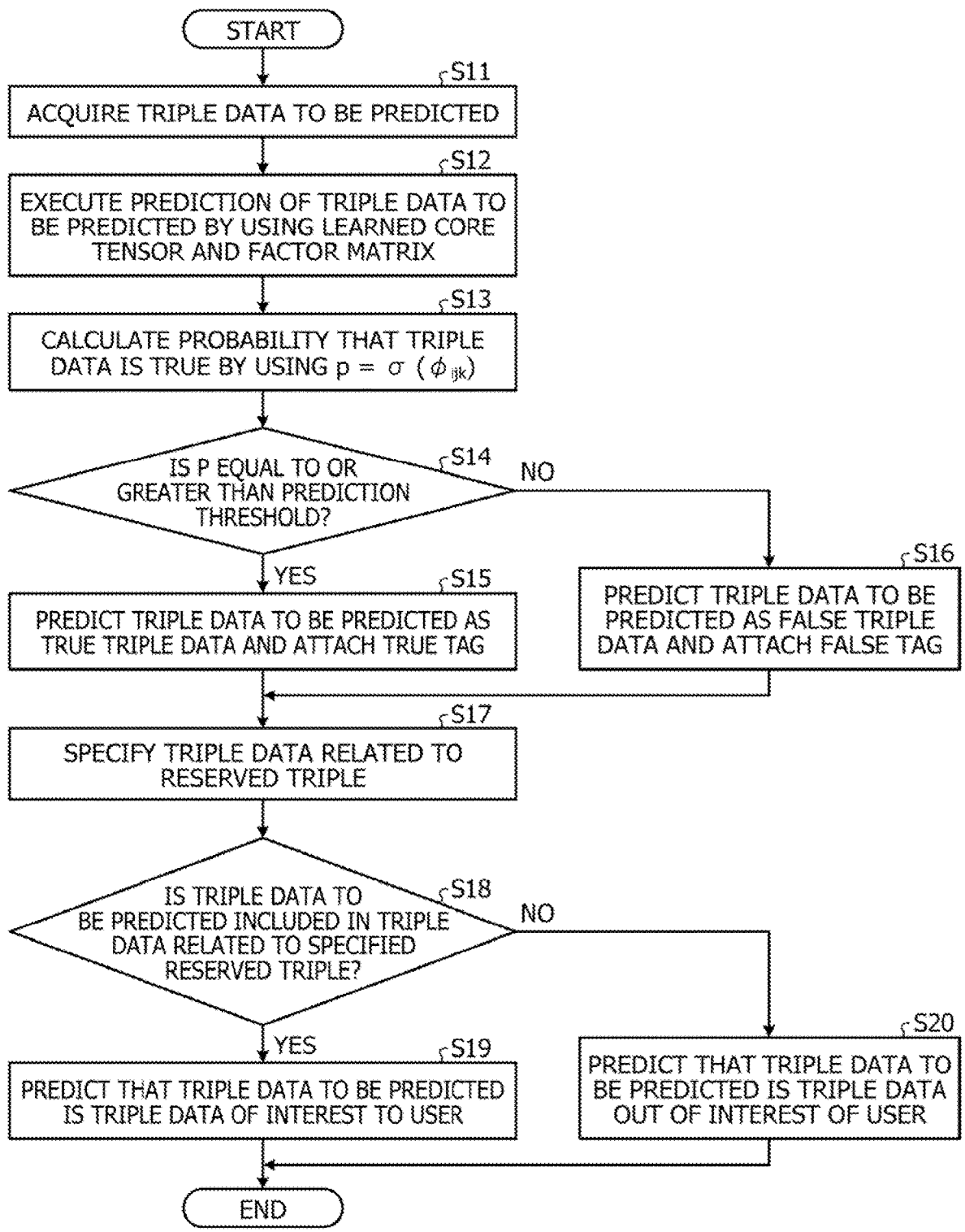
FIG. 5 is a flowchart of prediction processing by a machine learning apparatus according to an embodiment.

FIG. 5 is a flowchart of the prediction processing by the machine learning apparatus according to the embodiment. Next, the flow of the prediction processing performed by the machine learning apparatus 10 according to the embodiment will be described with reference to FIG. 5.

The prediction unit 128 holds a core tensor and factor matrices that approximate a third order tensor as a learning target acquired from the machine learning model generation unit 127 as a model. The prediction unit 128 acquires triple data to be predicted (step S11).

After that, the prediction unit 128 uses the learned core tensor and factor matrix to predict the triple data to be predicted (step S12).

Next, the prediction unit 128 calculates a probability that the triple data to be predicted is true by using $p = \sigma(\varphi_{ijk})$ (step S13).

Next, the prediction unit 128 determines whether P is equal to or greater than the prediction threshold (step S14). When P is equal to or greater than the prediction threshold (step S14: Yes), the prediction unit 128 estimates that the triple data to be predicted is a true triple data, and tags "true" to the triple data (step S15). By contrast, when P is less than the prediction threshold (step S14: No), the prediction unit 128 estimates that the triple data to be predicted is a false triple data, and tags "false" to the triple data (step S16).

Next, the prediction unit 128 searches for an element having an absolute value equal to or greater than the identification threshold from elements of which values are not fixed at the time of learning among the elements of the factor matrices corresponding to the elements of the core tensor G allocated to the group of reserved triples. The prediction unit 128 specifies triple data related to the reserved triple. Next, the prediction unit 128 specifies an entity and a relation related to the reserved triple. By using the entity and the relation related to the reserved triple, the prediction unit 128 specifies the triple data related to the reserved triple (step S17).

Next, the prediction unit 128 determines whether the triple data to be predicted is included in the triple data related to the specified reserved triple (step S18).

When the triple data to be predicted is included in triple data related to the specified reserved triple (step S18: Yes), the prediction unit 128 predicts that the triple data to be predicted is triple data of interest to the user (step S19).

By contrast, when the triple data to be predicted is not included in the triple data related to the specified reserved triple (step S18: No), the prediction unit 128 predicts that the triple data to be predicted is triple data that is out of the interest of the user (step S20).

As described above, the machine learning apparatus according to the present embodiment sets the triple data of interest as a reserved triple, and sets the value of the element to which the reserved triple is allocated in the training data core tensor as a large real number. The machine learning apparatus fixes the value of the element of the factor matrix related to the element to 1 (or −1). The machine learning apparatus executes learning by using a third order tensor in which the values are set, a core tensor in which values of predetermined elements are fixed, and a factor matrix.

In the normal Tucker decomposition, a coefficient is obtained so as to reproduce a tensor of data to be analyzed. By contrast, in TuckER through the sigmoid as in the machine learning apparatus according to the present embodiment, convergence to 1 occurs when the value of $\varphi_{ijk}$ is large. For this reason, since increasing the value in order to guarantee that the value is true does not affect lower level search, an appropriate model may be created even when the processing of the machine learning apparatus according to the present embodiment is performed.

In a case where the model after learning the training data is caused to perform true/false determination, it is desirable that the prediction result matches a correct answer. However, in the statistical learning model, it is usually difficult for any algorithm to get the correct answer for a designated individual data without sacrificing generalization. For the purpose of making the prediction of the reserved triple correct, a method of simply storing the relationship between the reserved triple and the correct answer is conceivable. However, in this case, when the triple data slightly shifted from the stored case is used, there is a high possibility of an error. For example, it may be said that it is impossible to acquire generalization capability normally desired by the prediction model. By contrast, the machine learning apparatus according to the present embodiment is capable of determining whether a reserved triple is true or false, which is equivalent to a correct answer label, even after learning and making a correct answer.

By setting the core tensor to have a sufficiently large size, it is possible to use a model that performs prediction in accordance with a teacher label in the method in the related art. However, this results in a prediction model in an over-learning state such as storing cases, and correct prediction for an unknown triple may not be expected. The number of dimensions assumed in the present disclosure is a core tensor having a smaller size, and accordingly, a model that has learned commonality of similar cases among learning cases is expected, and as a result, it is intended to accurately predict an unknown triple.

Among the machine learning models, for example, there is a nearest neighbor (k-NN) method. For the k-NN in a case of k=1, the true/false determination of prediction matches the training data. The probability that prediction of a case close to the training data is also correct is high. Although the k-NN treats one data such as one row or one case in a table format, the k-NN uses values of all attributes corresponding to all explanatory variables. By contrast, in a case where a knowledge graph is used as in the machine learning apparatus according to the present embodiment, triple data that is a set of three variables in all the attributes is used per case. For example, the machine learning apparatus according to the present embodiment may perform learning even when a condition of a problem setting is loose, and may improve versatility of learning.

In a framework of embedding a knowledge graph in the related art, in order to perform learning such that the designated training data is not erroneously determined as much as possible, a method of performing learning many times by using the designated training data, a method of increasing the weight of the designated training data, and the like are conceivable. However, in any of the methods, there is no guarantee that the designated data is not erroneously determined in the generated model. By contrast, the machine learning apparatus according to the present embodiment is capable of guaranteeing correct prediction for data designated as a reserved triple.

As described above, in the machine learning apparatus according to the present embodiment, a learning effect in specific data is guaranteed. For example, when the reserved triples that are the triple data designated as the interest target of the user are associated with the same core tensor element, it is guaranteed that the score remains high during the learning and is true even after the learning. Accordingly, the reliability of the learning may be maintained. The machine learning apparatus according to the present embodiment may present an event related to a fact of interest. For example, by performing learning by using the given reserved triples, the machine learning apparatus according to the present embodiment may specify other triples related to the reserved triples after the learning. Accordingly, a part of the data is able to be interpreted.

When the statistical machine learning of the related art is performed, relationships between pieces of data after the learning are unknown in many cases. Although the technique using TuckER may be expected to improve the accuracy of Link prediction, it is difficult to interpret data relevance from the decomposition result. By contrast, the machine learning apparatus according to the present embodiment makes it possible to interpret the data relevance.

(Hardware Configuration)

Figure 6:
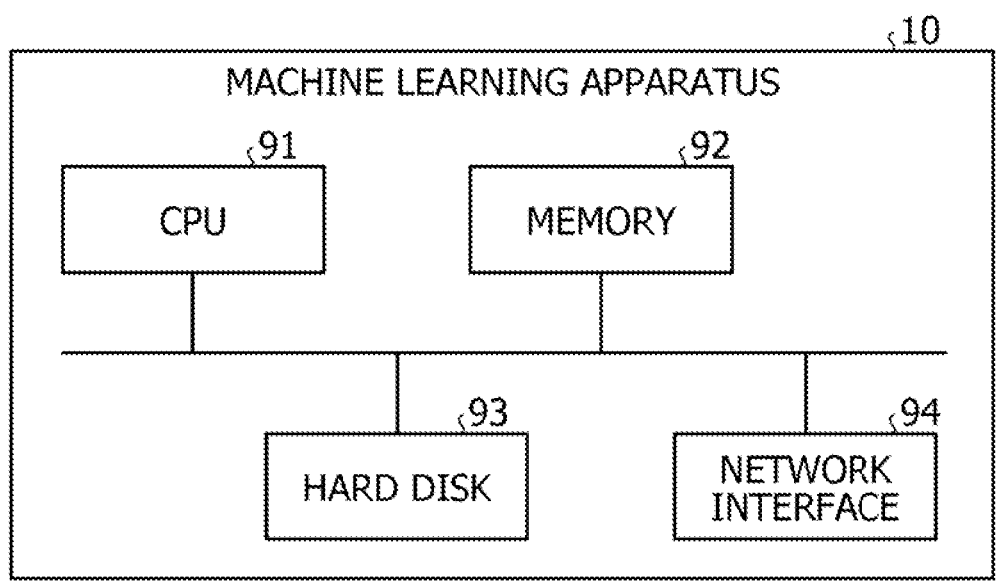
FIG. 6 is a hardware configuration diagram of a machine learning apparatus.

FIG. 6 is a hardware configuration diagram of the machine learning apparatus according to the embodiment. An example of the hardware configuration of the machine learning apparatus 10 according to the present embodiment is described below with reference to FIG. 6.

For example, the machine learning apparatus 10 according to the present embodiment includes a central processing unit (CPU) 91, a memory 92, a hard disk 93, and a network interface 94. The CPU 91 is coupled to the memory 92, the hard disk 93, and the network interface 94 via a bus.

The network interface 94 is a communication interface between the machine learning apparatus 10 and an external device. For example, the network interface 94 relays communication between the CPU 91 and the user terminal 20.

The hard disk 93 is an auxiliary storage device. The hard disk 93 implements a function of the data holding unit 11 exemplified in FIG. 1. The hard disk 93 stores various programs including an information processing program for realizing the functions of the control unit 12 exemplified in FIG. 1.

By reading various programs from the hard disk 93, developing the programs in the memory 92, and executing the programs, the CPU 91 may realize the functions of the control unit 12 exemplified in FIG. 1.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a machine learning program for causing a computer to executes processing, the processing comprising:
   generating a tensor representing a plurality of pieces of triple data, each triple data representing a relationship among entities in a knowledge graph;
   executing tensor decomposition of the tensor into a core tensor and factor matrices, under a condition that a value of a first element of each factor matrix corresponding to a first triple data and a value of an element of the core tensor are fixed; and
   using the decomposed core tensor and factor matrices to predict a confidence score or truth value for a newly input triple data, thereby improving prediction accuracy in knowledge graph embedding.

2. The non-transitory computer-readable recording medium according to claim 1, wherein
   the value of the first element is a real number greater than 1.

3. The non-transitory computer-readable recording medium according to claim 1, the processing further comprising:
   acquiring the plurality of pieces of triple data by creating triple data of a negative example based on triple data of a positive example.

4. The non-transitory computer-readable recording medium according to claim 1, wherein
   the first element and the second element are in a positional relationship of being multiplied together when a product of the core tensor and the factor matrix is calculated.

5. The non-transitory computer-readable recording medium according to claim 1, the processing further comprising:
   receiving designation of triple data to be predicted; and
   determining at least one of true and false of the triple data to be predicted and relevance between the triple data to be predicted and the first triple data by using the core tensor and the factor matrix obtained by the tensor decomposition.

6. The non-transitory computer-readable recording medium according to claim 1, the processing further comprising:
   decomposing the first triple data into a plurality of groups; and
   allocating an element of the core tensor corresponding for each of the groups.

7. A machine learning method implemented by a computer, the machine learning method comprising:
   generating a tensor representing a plurality of pieces of triple data, each triple data representing a relationship among entities in a knowledge graph;
   executing tensor decomposition of the tensor into a core tensor and factor matrices, under a condition that a value of a first element of each factor matrix corresponding to a first triple data and a value of an element of the core tensor are fixed; and
   using the decomposed core tensor and factor matrices to predict a confidence score or truth value for a newly input triple data, thereby improving prediction accuracy in knowledge graph embedding.

8. A machine learning apparatus comprising:
   a memory; and
   a processor coupled to the memory, the processor being configured to perform processing, the processing including:
   generating a tensor representing a plurality of pieces of triple data, each triple data representing a relationship among entities in a knowledge graph;
   executing tensor decomposition of the tensor into a core tensor and factor matrices, under a condition that a value of a first element of each factor matrix corresponding to a first triple data and a value of an element of the core tensor are fixed; and
   using the decomposed core tensor and factor matrices to predict a confidence score or truth value for a newly input triple data, thereby improving prediction accuracy in knowledge graph embedding.

* * * * *